United States Patent [19]
Brock et al.

[11] Patent Number: 5,664,086
[45] Date of Patent: Sep. 2, 1997

[54] METHOD AND APPARATUS FOR GENERATING DIGITAL TYPE FONT, AND RESULTING FONTS USING GENERIC FONT AND DESCRIPTOR FILE

[75] Inventors: Ernest A. Brock, Fair Oaks; Lawrence G. Applegate, Sacramento, both of Calif.

[73] Assignee: Adobe Systems Incorporated, San Jose, Calif.

[21] Appl. No.: 48,766

[22] Filed: Apr. 16, 1993

[51] Int. Cl.$^6$ .................................................. G06F 15/00
[52] U.S. Cl. .................................... 345/468; 345/144
[58] Field of Search .................................. 395/150, 151, 395/148, 144, 147, 149

[56] References Cited

U.S. PATENT DOCUMENTS

| | | | |
|---|---|---|---|
| Re. 30,679 | 7/1981 | Evans et al. | 395/151 |
| 4,254,468 | 3/1981 | Craig | 395/150 |
| 4,298,945 | 11/1981 | Kyte et al. | 395/150 |
| 4,511,893 | 4/1985 | Fukuda | 345/192 |
| 4,553,214 | 11/1985 | Dettmer | 395/143 |
| 4,594,674 | 6/1986 | Boulia et al. | 395/150 |
| 4,670,841 | 6/1987 | Kostopoulos | 364/419 |
| 4,674,059 | 6/1987 | Schrieber | 395/142 |
| 4,675,830 | 6/1987 | Hawkins | 395/138 |
| 4,742,344 | 5/1988 | Nakagawa et al. | 345/26 |
| 4,785,391 | 11/1988 | Apley et al. | 395/150 |
| 4,843,593 | 6/1989 | Yanaru et al. | 395/148 |
| 4,959,801 | 9/1990 | Apley et al. | 395/150 |
| 4,993,853 | 2/1991 | Brown, III et al. | 395/108 |
| 5,099,435 | 3/1992 | Collins et al. | 395/150 |
| 5,148,293 | 9/1992 | Miyachi | 358/444 |
| 5,150,108 | 9/1992 | Markham | 345/143 |
| 5,175,811 | 12/1992 | Sone et al. | 395/150 |
| 5,201,032 | 4/1993 | Kurose | 395/150 |
| 5,233,671 | 8/1993 | Murayama | 382/242 |
| 5,280,577 | 1/1994 | Trevett et al. | 395/150 |
| 5,305,433 | 4/1994 | Ohno | 395/150 |
| 5,353,396 | 10/1994 | Ahlquist, Jr. et al. | 395/142 |
| 5,398,311 | 3/1995 | Seto | 395/151 |
| 5,416,898 | 5/1995 | Opstad et al. | 395/150 |
| 5,473,743 | 12/1995 | Watanabe | 395/151 |
| 5,539,868 | 7/1996 | Hosoya et al. | 395/151 |

OTHER PUBLICATIONS

Ackerson, Karen L., WordPerfect Series 5 Edition, pp. 162–163, 230–231 (1988).

Flowers, Jim, "Digital Type Manufacture: An Interactive Approach", Computer, 1984 IEEE, pp. 40–48.

Givens, Robert M., "Intellifont Font Scaling Technology—An Update", Proceedings of the Lasers in Graphics/Electronic Publishing in the 80's Conference, pp. 317–326.

Hawkins, Thomas B., "Compugraphic", Proceedings of the Lasers in Graphics/Electronic Publishing in the 80's Conference, pp. 77–87.

Karow, Peter, "Digital Formats for Typefaces", pp. 113–135.

Richmond, Wendy, "Digital Masters", Communication Arts, May/Jun. 1984, pp. 78–81.

*Primary Examiner*—Heather R. Herndon
*Assistant Examiner*—Stephen Hong

[57] ABSTRACT

A computer-implemented apparatus and method for generating an output digital font from a base font and one or more font descriptor files. In one example, the method involves, the steps of retrieving from memory a file containing instructions and data for a generic base font; retrieving from memory a font descriptor file containing specifications for operating upon the base font to produce the desired output font; and then generating the output font by performing operations upon the base font in accordance with the specifications contained in the font descriptor file, to produce a character program for each character in the base font wherein the data representing the output font is the generic font data as transformed in accordance with said specification. Two or more font descriptor files may be combined, such as by using mathematical weighted averaging of the parameter values for different typographic design features, or otherwise, to create font descriptor files for hybrid typefaces.

9 Claims, 13 Drawing Sheets

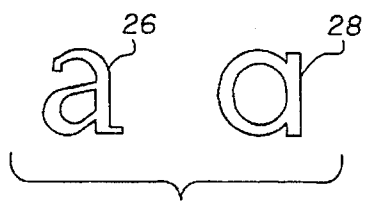
FIG. 3
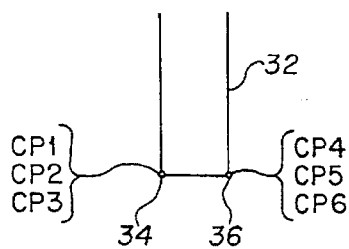
FIG. 4
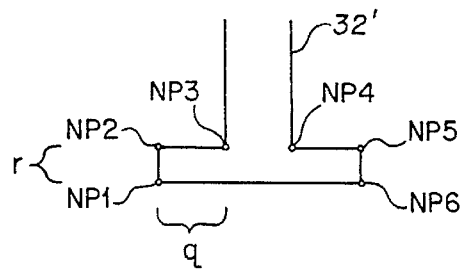
FIG. 5
| point # | base coord. | | design 1: serif width | | design 2: serif height | |
|---|---|---|---|---|---|---|
| | a | b | c | d | e | f |
| | x coord. | y coord. | horz. offset | vert. offset | horz. offset | vert. offset |
| CP1 | 10 | 0 | -10 | 0 | 0 | 0 |
| CP2 | 10 | 0 | -10 | 0 | 0 | 10 |
| CP3 | 10 | 0 | 0 | 0 | 0 | 10 |
| CP4 | 20 | 0 | 0 | 0 | 0 | 10 |
| CP5 | 20 | 0 | +10 | 0 | 0 | 10 |
| CP6 | 20 | 0 | +10 | 0 | 0 | 0 |
FIG. 6
| Design | | Value |
|---|---|---|
| 1 | serif width | 1 |
| 2 | serif height | 0.5 |
FIG. 7
| point # | x coordinate | y coordinate |
|---|---|---|
| NP1 | 0 | 0 |
| NP2 | 0 | 5 |
| NP3 | 10 | 5 |
| NP4 | 20 | 5 |
| NP5 | 30 | 5 |
| NP6 | 30 | 0 |
FIG. 8

| | Design | Value |
|---|---|---|
| 70 { 1 | serif width | 0 |
| 2 | serif height | 0.5 |
FIG. 9
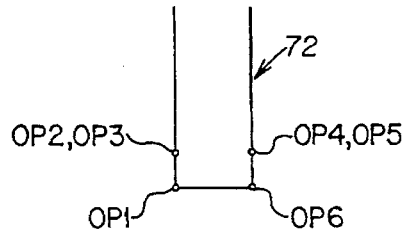
FIG. 10
| point # | x coordinate | y coordinate |
|---|---|---|
| OP1 | 10 | 0 |
| OP2 | 10 | 5 |
| OP3 | 10 | 5 |
| OP4 | 20 | 5 |
| OP5 | 20 | 5 |
| OP6 | 20 | 0 |
FIG. 11
| | Design | Value |
|---|---|---|
| 90 { 1 | serif width | 0.5 |
| 2 | serif height | 0.5 |
FIG. 12
| point # | x coordinate | y coordinate |
|---|---|---|
| PP1 | 5 | 0 |
| PP2 | 5 | 5 |
| PP3 | 5 | 5 |
| PP4 | 25 | 5 |
| PP5 | 25 | 5 |
| PP6 | 25 | 0 |
FIG. 13
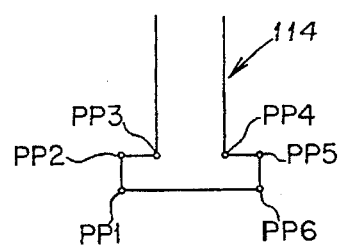
FIG. 14 numTables — 180   {number of tables in this font}
tables — 182   182a   {a table which is composed of numTables pairs of:}
   table name   {four character name of table}
   offset — 182b   {offset from beginning of font to this table}

FIG. 21 fontID — 190   {the unique id number for this font}
version — 192   {the version number of this font}
name — 194   {a string containing the name of the font}
copyright — 196   {a string containing the copyright notice for this font}

FIG. 22 numGlyphs — 202   204   {the number of glyphs named in the glyph names table}
offset[1..numGlyphs]   {array of offsets in glyph order for start of each name string}

FIG. 23 numGlyphs — 212   214   {the number of glyphs named in the base font}
offset[1..numGlyphs]   {array of offsets in glyph order for start of each glyph's data}

FIG. 24

```
unicode         ~222    {the unicode value for the glyph}
designMap       ~224    {an array that maps design features for this glyph to font wide
                         design features}
originPoint     ~226    {character orgin offset}
widthPoint      ~228    {character width}
numContours     ~232    {number of contours in this glyph}
contours        ~234    {numContours contours with each contour represented as:}
    contourFlag         {flags describing the contour}
    numSegments         {number of line/curve segments in the contour}
    segments            {numSegments segments with each segment represented as:}
236     segFlag         {flag specifying if segment is line or curve and specifying if
                         each of the points in the segment has a set of design offsets
                         associated with it}
        point1          {start point of line or curve segment}
        point2          {1st off-curve point of a cubic Bezier curve segment}
        point3          {2nd off-curve point of a cubic Bezier curve segment}
```

*FIG. 25*

```
numFontNames            ~242  {the number of font names in the font names table}
offsets[1..numFontNames] ~246 {offsets to the names}
```

*FIG. 26*

```
numFonts                      {the number of font descriptors in the font descriptor table}
offsets[1..numFonts]    ~252  {offsets to the start of each descriptor}
```

*FIG. 27*

```
baseFontID          {the id of the base font this discriptor works with}
familyID            {the id of the string for the font family name}
weightID            {the id of the string for the font weight name}
menuNameID          {id of the string for the name for use in font menus}
fontFlags           {discriptive flags for the font}
italicAngle         {the slant angle of the font}
weightClass ⁄—262   {the weight of the font-normal,bold,light,etc.}
widthClass          {the width of the font-normal,condensed,extended,etc.}
stemClass           {the serif type-san-serif, slab serif, cup serif, etc.}
underlinePosition   {position of the underline}
underlineThickness  {stroke width for an underline}
familyAscent        {the ascent height to use for all fonts belonging to this family}
familyDescent       {the descent height to use for all fonts belonging to this family}
familyLineGap       {the extra leading to use for all fonts belong to this family}
vector [1..NumDesigns] {array of settings for each design parameter in the base font}
numGlyphOvers       {number of glyph overrides for this font}
offsetToGlyphOvers  {offset to the list of glyph overrides}
numGlyphs           {number of glyphs in this font}
metricOffset        {offset to the list of metrics for characters in this font}
numKerns            {number of kerning pairs for this font}
kernOffset          {offset to the list of kerning pairs}
glyphOverTable      {a table which is composed of numGlyphOvers pairs of:}
  charNum           {the font character to override}
  glyphNum          {the glyph to use in place of the base glyph for charNum}
metricsTable        {a table composed of numGlyphs pairs of:}
  condenseAdj       {the width condense adjustment value}
  leftSide          {the left sidebearing for the character}
kernTable           {a table composed of numKerns triplets of:}
  leftChar          {left character in kern pair}
  rightChar         {right character in kern pair}
  amount            {kerning amount}
```

FIG. 28

```
for each character in the font
begin
    look up the glyph to use from glyphOver table in the font descriptor
    set the advance width for this character to the glyph width from the font descriptor
      metrics Table
    get the condenseAdj amount for this glyph from font descriptor metrics Table
    add condenseAdj to the first vector array entry
    get the offset to the glyph data from the Glyph Directory of base font
    for each contour of the glyph
    begin
     ⎛  for each segment in the contour
     ⎜  begin
     ⎜      for each point in segment
     ⎜      begin
     ⎜          if flag for point specifies that design offsets are used
     ⎜          begin
     ⎜              compute sum of:
29-1 ⎨                  horizontalOffsets[i] * vector[designMap[i]]
     ⎜                  verticalOffset[i] * vector[designMap[i]]
     ⎜              for all i's from 1 to number of glyph designs
     ⎜              add sum of horizontalOffsets to x
     ⎜              add sum of verticalOffsets to y
     ⎜              add leftSide value from metrics Table to x
     ⎜          end
     ⎝      end
    end
end
```

FIG. 29A

```
for each segment in the contour
begin
    for each point in segment
    begin
        if flag for point specifies that design offsets are not used
        begin
            interpolate x between nearest points on either side
                of this point that were processed using
                design offsets
            interpolate y between nearest points on either side
                of this point that were processed using
                design offsets
        end
    end
end                                                                      } 29-2
for each segment in the contour
begin
    if segment's start and end points are the same, remove the segment
    if segment is a curve and all of it's control points are colinear,
        convert the segment into a line segment
    if a local minima/maxima occurs in this segment,
        split the segment at the minima/maxima
end                                                                      } 29-3
end
```

FIG. 29B baseFontID —302    {the base font this descriptor works with}
familyName —304    {a string naming the font family}
weightName —306    {a string describing the weight of the font}
blendTree —308     {binary tree describing blend}

FIG. 30 amount —310             {the numeric amount of the blend}
baseID or nestFlag —312 {id of the base font or flag specifying the base font is nested}
blendID or nestFlag     {id of the blend font or flag specifying the blend font is nested}

FIG. 31

```
                [font]
                  |
                 30%------[blend:]
                             |
[base:]----------------50%-----------[blend:font 500]
   |
[base:font 300]
   |
  75%-----[blend:font 400]
   |
[base:font 200]
```

FIG. 32

```
baseFontID
familyName
weightName
30%
300
nestFlag
        50%
        nestFlag
                75%
                200
                400
```
⎫
⎬ 500
⎭

*FIG. 33* set outputVector [i] to:
    baseFont vector [i] + amount*(blendFont vector [i] - baseFont vector [i]
for all i from 1 to number of design parameters in font set outputMetrics [i] to:
    baseFont metrics [i] + amount*(blendFont metrics [i] - baseFont metrics [i]
for all i from 1 to number of glyphs in the font set outputKerning [i] to:
    baseFont kerning [i] + amount*(blendFont kerning [i] - baseFont kerning [i]
for all i from 1 to number of kerning pairs in the font set outputGlyphOverrides to baseFont glyphOverrides repeat this process from the bottom of the binary tree to the top

*FIG. 34*

METHOD AND APPARATUS FOR GENERATING DIGITAL TYPE FONT, AND RESULTING FONTS USING GENERIC FONT AND DESCRIPTOR FILE

FIELD OF THE INVENTION

This invention relates to the field of character and image representation, storage, transmission and generation on a computer output device. More particularly, it relates to a method and apparatus for producing scalable contour data for use in displaying alphanumeric and other characters on a computer screen or printer, as well as to the storage and transmission of text and other collections of characters.

BACKGROUND OF THE INVENTION

A wide range of analog character shapes exist for representing a given alphanumeric character or typographic symbol (i.e., numbers, letters, punctuation marks and dingbats). Each such shape is distinguished by its various design features such as, but not limited to, underlying geometry, stroke thickness, character height, serifs, joinery, placement and number of contours and ratio of thin-to-thick strokes. A collection of characters (numbers, letters and other symbols) that share common design features is called a "typeface". A particular instantiation of a typeface design, in a particular medium, is referred to as a "font". Often, the term font refers to a rendering of a typeface in a single point size and a single weight, but we shall not impose such a limitation herein. Until the last several years, fonts were typically rendered in media such as metal slugs or photomasks for phototypesetters. Now, fonts are frequently rendered in digital form, for use in digital computers and digital display devices, such as personal computers and laser printers, to produce output in a particular typeface design.

There are several commercially standard formats in widespread use for representing fonts in digital form, such as formats adopted and popularized by Bitstream Inc. of Cambridge, Mass.; Adobe Systems, Inc. of Mountain View, Calif.; Apple Computer, Inc., of Cupertino, Calif.; Microsoft Corporation of Bellevue, Wash.; URW of Hamburg, Germany; and Agfa Compugraphic of Wilmington, Mass. Each format has its unique characteristics. They share in common, though, the fact that for a given typeface design, a font has for each character a unique computer program which encodes the unique design of that character. A font is thus a collection of computer programs and data. Each typeface thus is reproduced from its own set of unique character programs. For instance, one set of character programs is used to represent the characters of the typeface Times and another set of character programs is used to represent the typeface Helvetica. The character programs are not universal, but differ with each of the available font-encoding formats.

Typically, a digital font for a full Roman character set (i.e., typeface) requires about 30–60 kB (kilobytes) of memory (on average, assume 45 kB per font). A document prepared with a modern word processing or desktop publishing system, though, may typically contain several typefaces. Consequently, when such a document is to be stored or transmitted electronically, it may be necessary to transmit (or store) along with the text data for the document one or more font files of about 45 kB each. A document set in four fonts will require about 180 kB in font files alone, in addition to the text file for the document. Similarly, if a laser printer is to be provided with the capability of printing in a number of resident typefaces, a number of fonts will have to be stored, each at an average of about 45 kB. Moreover, the size(s) of the font file(s) does(do) not scale with document size. The same large font files are needed for a 4k text file as for a 400k text file. In general, different weights of a typeface design may be treated as different fonts, exacerbating the problem. Fortunately, intelligent font scaling algorithms can be used to produce from a single font characters of different sizes, so a font is not needed for each different point size of type to be employed in a document.

Thus among the most significant drawbacks of such prior digital fonts is their size. Each font consumes a considerable amount of memory and represents a large additional amount of data to be transmitted along with the encoded text of a document to be output using that font (or, more correctly, the typeface represented by the font). A further restriction inherent in the use of such fonts is that the user must have available, when a document is being output, fonts for all typefaces the user wishes to employ. This means the user is constrained in his or her creativity to use of the typefaces at hand.

SUMMARY OF THE INVENTION

These and other drawbacks of the prior art are overcome, and additional advantages achieved, with a unique system employing a single, generic base font from which many specific typeface designs can be derived, a descriptor file for each specific typeface design, and a font generator which creates from the generic base font and one or more descriptor files a character program for each character in the font.

More precisely, instead of a single, generic base font, there may be provided a generic base font for each category of typeface. A "category" of typeface is the term used herein to distinguish from each other alphabets of distinctly different topology: e.g., Roman type, Cyrillic type, Arabic type, Kanji type and other forms of type.

In its descriptor file, a specific typeface design is represented as a compact enumeration of modifications to be made to its base font. These enumerations are contained in an encoded file which comprises program/data structures of defined arrangement. A descriptor file for a specific typeface design, according to the preferred embodiment disclosed below, requires only about 2K of data.

The generic base font may be made resident in a printer, video terminal or the like. Thus, only the descriptor file(s) for the typefaces in use need be stored or transmitted with a document; the generic base font is essentially part of the environment. Only about 2K additional program/data is needed for each typeface descriptor file which is to be associated with a specific document.

Additionally, descriptor files may be easily modified, thus providing a simple way to alter character programs so as to alter the appearance of type. That is, by modifying an existing descriptor file, it is possible to generate a typeface design which is varied, to almost any desired degree and in almost any desired way, from a previously encoded typeface design. Further, the parameters of two or more typeface designs readily can be blended by combining appropriate fields in their descriptor files, according to any desired mathematical algorithm (e.g., by performing a weighted average). Thus a user can easily blend two or more typeface designs, or otherwise modify a typeface design.

A library of typeface designs comprises a library of their descriptor files plus the associated generic base font. Thus a library of, say, one hundred fonts at a total of about 4.5 MB volume can be replaced by a generic base font of about 200 kB, descriptor files of 200–300 kB and a font generator of about 60 kB. Not only is there a large savings in memory and transmission time, but also there is much enhanced capability given the user.

The invention will be more fully understood from the detailed description presented below, which should be read in conjunction with the accompanying drawing.

BRIEF DESCRIPTION OF THE DRAWING

In the drawing,

FIG. 3 is a pictorial illustration of two different base design forms for the letter "a"—a Humanist form and a Grotesque form, as an example of a character available in two base design forms;

FIG. 4 is a diagrammatic illustration of an exemplary glyph in a base font according to the invention, which glyph represents a character stem;

FIG. 5 is a diagrammatic illustration of a serifed stem produced by modifying the base stem of FIG. 4.;

FIG. 6 is a diagrammatic illustration of a base font data structure, or program, corresponding to the stem glyph of FIG. 4;

FIG. 7 is a diagrammatic illustration of a font descriptor file according to the invention, which is used with the base font program file of FIG. 6 to produce the serifed stem design of FIG. 5;

FIG. 8 is a diagrammatic illustration of a character program produced by the generator of the present invention, from the base font data structure of FIG. 6 and the descriptor file of FIG. 7;

FIG. 9 is a diagrammatic illustration of a font descriptor file used with the base font of FIGS. 4 and 6 to generate the output contour of FIG. 10;

FIG. 10 is a pictorial illustration of the output contour generated by applying the font descriptor file of FIG. 9 to the base font of FIGS. 4 and 6;

FIG. 11 is a diagrammatic illustration of a character program produced by the generator of the present invention, from the base font data structure of FIG. 6 and the descriptor file of FIG. 9;

FIG. 12 is a diagrammatic illustration of a descriptor file according to the present invention produced by blending the descriptor file of FIG. 7 with the descriptor file of FIG. 9;

FIG. 13 is a diagrammatic illustration of a character program produced by the generator of the present invention, from the base font data structure of FIG. 6 and the descriptor file of FIG. 12;

FIG. 14 is a pictorial illustration of the output contour generated by applying the font descriptor file of FIG. 12 to the base font of FIGS. 4 and 6;

FIG. 21 is a diagrammatic representation for a data structure for a file or a portion of a file constituting a Directory of Tables, comprising a directory specifying the address offset to each of the tables in a font according to the invention;

FIG. 22 is a diagrammatic illustration of an exemplary data structure for a table containing information specific to the base font according to the invention;

FIG. 23 is a diagrammatic illustration for a data structure called Glyph Name Directory herein;

FIG. 24 is a diagrammatic illustration of a data structure for a table called Glyph Directory herein;

FIG. 25 is a diagrammatic illustration of a data structure for storing the data for an individual glyph in the Glyph Data Table herein;

FIG. 26 is a diagrammatic illustration for a data structure called Font Names Directory according to the invention;

FIG. 27 is a diagrammatic illustration of a data structure called Font Directory;

FIG. 28 is a diagrammatic illustration of a data structure for storing each font descriptor in the Font Descriptor Table according to the invention;

FIG. 29 is a psuedo-code rendering illustrating an algorithm for generating an output font according to the invention, from a base font and a font descriptor;

FIG. 30 is an exemplary data structure representation for compactly describing blends of fonts according to the invention;

FIG. 31 is a data structure representation of encoding for each node of the font blend tree of FIG. 30;

FIG. 32 is a diagrammatic illustration of an exemplary blend tree;

FIG. 33 is a diagrammatic illustration of a data structure providing an encoded representation of the exemplary blend tree of FIG. 32; and FIG. 34 is a diagrammatic illustration in pseudo code form of an algorithm for converting a blend font descriptor into a font descriptor, which can then be used in the algorithm of FIG. 29 to produce an output font.

DETAILED DESCRIPTION

A complete typeface design for a Roman character set includes typically about one hundred to several hundred characters—upper and lower case letters, numerals, punctuation marks and special symbols. Various techniques are in common usage for providing digital encodings of typeface designs, to allow the reproduction of those designs on output devices such as video screens and laser printers. In order to avoid having to digitize and store a separate digitization for each point size the user may require, there have been developed in recent years various scalable font technologies (such as Adobe Systems' Postscript outlines, Bitstream's Fontware and Speedo formats, Agfa's Intellifont, Apple Computer's True Type, and others). These technologies are shown, for example, in U.S. Pat. Nos. 4,675,830, issued Jun. 23, 1987 to Hawkins; 4,785,391 issued Nov. 15, 1988 to Apley et al; and 5,099,435, issued Mar. 24, 1992 to Collins et al, which are hereby incorporated by reference for their disclosures.

According to these technologies, within a font each character in the typeface is represented by a character program which, in turn, represents the character in outline form. The character program comprises a collection of data points, some of which are on the character outline and others which are not on the character outline, and instructions as to how to interpret and treat the data points in order to construct therefrom an image of the embodied character. The techniques shown in the aforesaid patents, for example, then are used to produce bit map representations of the characters at selected (i.e., scaled) sizes and resolutions. The actual output display is provided from these bit map representations.

Figure 1:
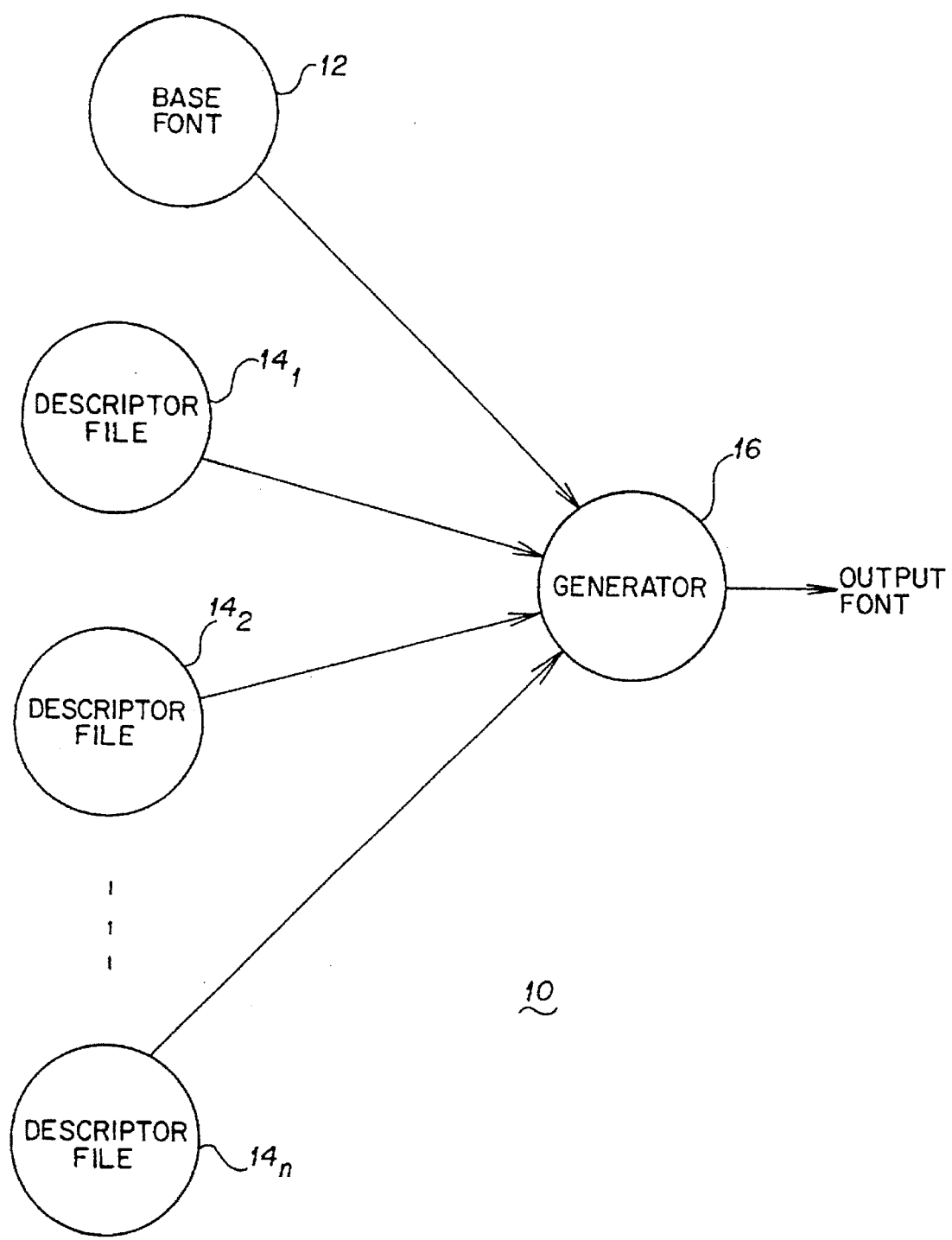
FIG. 1 is a diagrammatic illustration of a synthetic font generation system according to the present invention.

Referring to FIG. 1, a system 10 according to the present invention comprises at least one generic base font 12, one or more font descriptor files $14_1$–$14_n$ and a font generator, or "engine," 16. The generator 16 operates in the manner described below, to generate a digital font corresponding to the one or more font descriptor files which are active at a given time; alternatively, since a font is a collection of character programs, the generator may be said to generate character programs for the font.

Figure 2:
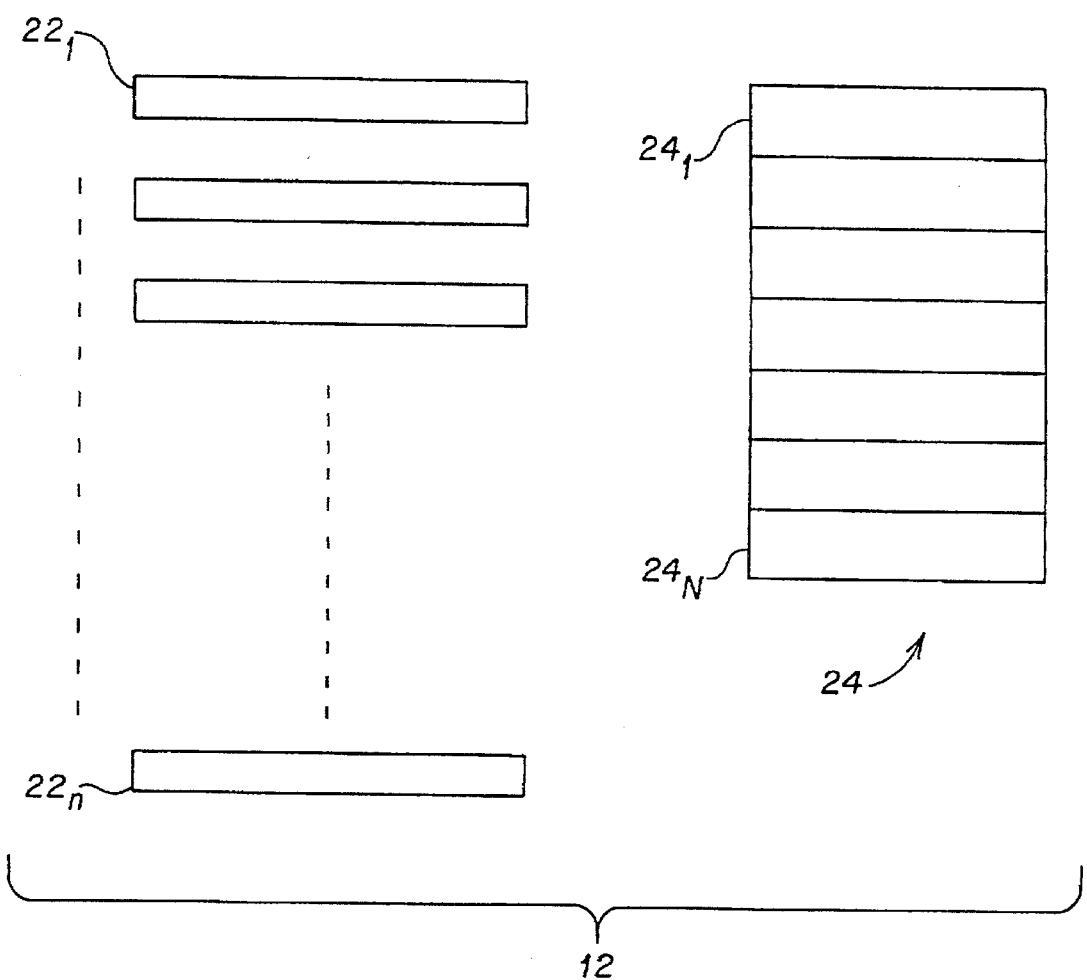
FIG. 2 is a diagrammatic illustration of a base font according to the invention.

As indicated diagrammatically in FIG. 2, each generic base font program 12 includes a set of character descriptions, in the form of character programs $22_1$–$22_n$, and a fixed set of font wide design variables $24_1$–$24_N$ (where there is no inherent relationship between "n" and "N"). Either the character programs are arranged in some known sequence or each character program contains one or more fields identifying the corresponding character. For example, if the characters are arranged alphabetically, then numerically, and then followed by symbols in a known order, the first character might be a lower "a," the second character an upper case "A.", etc. Alternatively, the character programs may be arranged in a random order, in which case the first (or some other) field in the program file is a character name. Thus, if the first character program is for the numeral "8," the first field in the program file may be the word "eight" or a binary code for the character "8."

A design variable can be specific to an individual character program or it can apply to a collection of character programs. Each design variable $24_i$ is assigned a unique identifier, which is or translates to a numerical value. For instance, if the generic font 12 contains one hundred variable design features, they would be numbered from 1 to 100, or x1 to x100 or the like. Design feature $24_1$ may be stroke weight, feature $24_2$ may be letter height, etc.

In the base font, a special character program (the "base character program") is provided for each character in the font. (Note that for purposes of this description, the term "character" is intended to encompass both entire letter forms, numerals and symbols, and component parts thereof, such as serifs, stems, and the like. These component parts are sometimes called "glyphs." Where it is necessary to distinguish the two types of characters, those formed from multiple glyphs will be called "full characters." Where multiple glyphs are involved, instructions must also be included for assembling full characters from the available glyphs. Thus, it will be understood that a "glyph" may comprise a unitary character on a piece of a character. In a base character program, a character is encoded into data and instructions representing the contours of the character plus a sufficient number of control points to permit replication of a wide range of design characteristics, including strokes, serifs and other ornamentation.

More than one set of contours may be allocated (or, alternatively, more than one character program may be provided), for a character which can be drawn with contours and base designs which differ significantly in topology. For example, as shown in FIG. 3, the lower case letter "a" may be represented [in] two different base design forms: in the Humanist form 26 and the Grotesque form 28. The character program or programs for the letter "a" must thus provide for both base forms. Consequently, $22_1$ may correspond to the Humanist form of the letter "a" and $22_2$ may correspond to the Grotesque form. A descriptor file for a given font will select the desired form for each character available in multiple forms, by selecting appropriate character programs.

FIGS. 4–8 provide a more specific exemplary illustration of this technique. In FIG. 4 is shown a portion of a generic contour 32 for the stem of an unspecified letter (i.e., a stem "glyph"). Since a character stem may or may not have a serif, control points are provided on the base character contour (i.e., in the base font character program) to allow for "expansion" to serif form or "contraction" to san serif form. To this end, control points CP1, CP2 and CP3 are provided in association with the base coordinates of point 34; and control points CP4, CP5 and CP6 are provided in association with the base coordinates of point 36. The use of these control points will be explained more fully below; note, however, that the control points CP1–CP6 may be moved outwardly from their location in the base font to form a serif.

The control points of each character contour include numeric data for specifying an initial position in the coordinate system-used for the descriptor files. In the example, this is, and usually will be, a Cartesian coordinate plane. The numeric data comprising the control points further includes a list of trajectories. Each trajectory encodes three data: a displacement direction, a displacement magnitude and the design feature number with which the trajectories associate. Each control point's list of trajectories need only include trajectories for the design features that affect it. Trajectories are specified, as well, for controlling features relating to all of the characters in the font and also for controlling features specific to an individual character. For example, trajectories are specified for controlling the general width of all serifs in the font and for modifying the widths of the serifs in a specific character.

Control points are preferably located in the base font so that their trajectories are in "outward" directions when another font is generated from the base font. This produces fewer rounding errors than the alternative: locating the control points on the expanded form of a character and their moving them "inwardly"—e.g., to produce a non-serifed font from a base serifed font.

To illustrate the operation of the control points, refer now to FIG. 5, which shows the base stem 32 of FIG. 4 modified to become a serifed stem 32'. Control point CP1 specified a trajectory to the left a distance "q" to point NP1. (Or to the left a distance q and down a distance "r", depending how the character height is to be adjusted to compensate for the "addition" of the serif.) Control point CP2 specified a trajectory to the location of point NP2. Control point CP3 either specified no motion or a vertical trajectory a distance r. Control points CP4–CP6 in this example provided mirror image specifications mapping them to the locations of points NP4–NP6, respectively.

The transformation from the generic base stem 32 of FIG. 4 to the serifed stem 32' of FIG. 5 results from use of a descriptor file to operate on the base font, as stated above. Turning to FIG. 6 there is shown in diagrammatic form a corresponding base font data structure (or program) 40, or portion of a base font data structure for the stem 32 of FIG. 4. Similarly, FIG. 7 shows in diagrammatic form a font descriptor file 50 which is used by the generator to produce from the generic base font the final serifed stem design of FIG. 5. Applying the generating transformations x coordinate=a+1c+0.5e and y coordinate=b+1d+0.5f, as specified by the descriptor file 50 for stem 32, the generator produces the character (glyph) program 60 for the new contour, listed in FIG. 8.

The example of FIGS. 4–8, of course, shows how the present invention works relative to a single feature of a character—in this case, a stem. By simple extension to each portion of a character contour in turn, and to each contour of a multiple-contour character, the same method is employed to generate an entire character program for outputting the complete character image. For simplicity, the control points in the base font may be processed in the same sequence as that in which they are arranged in the base font, though this method does not require such sequential processing.

A descriptor file for a specific font design preferably includes a setting value for each of the base font's design variables (which may involve one or more control points), spacing information for each character and a list of character forms to select for those characters for which multiple base forms are available—e.g., a flag which selects either the Humanist "a" or the grotesque "a". The specification, or descriptor file, is very compact compared to the file which encodes the base font.

The generator 16 produces a contour representation for a specific typeface by combining the appropriate descriptor file with each of the generic base font's character programs. This combination process includes not only the movement of contour control points and attendant curve-fitting, but also may involve resolving designs features, reducing the contour representation to the minimum set of points needed for each character, and/or assigning spacing to each character.

The values, in each entry of the font descriptor file, determine how the generator produces, from the individual contour control points in the generic font character programs, final contour representations which are executable to produce the typeface of the selected design. The process is illustrated in FIG. 29, which is discussed below. It is useful to note here that for each contour of a glyph, as outlined in FIG. 29, three processes are executed. First, for at least selected areas of the control points of the base character, a computation is performed to yield a displacement by which the control point is mapped to a new location to produce the contour of the selected design. This displacement is the sum of the trajectory magnitudes, modified by the setting (i.e., original base font control point) values. That is, the generator provides output coordinates for a point in the generated font which corresponds to a control point of the base font transformed by the computed displacement. This is process 29-1 in FIG. 29. It should be noted that control points may, but need not, be located on a character contour. In one common form of character outline encoding, a cubic Bezier curve representation, some control points (specifically, for curves) explicitly are not on the contour, or curve itself.

It is not necessary that in process 29-1 a displacement be computed for each and every control point. Selected control points can be chosen (in process 29-1 this is indicated by the line "if flag for point specifies that design offsets are used) to be displaced. Then, in process 29-2 for each control point whose displacement was not computed in process 29-1, a displacement value is determined by interpolating between mapped locations determined for neighboring contol points in process 29-1.

After all the control points for the output font have been thus computed, a "filter" routine may be executed to remove overlapping and non-essential points. This is process 29-3. The result is a character program representing, in part, the minimum set of contour points necessary for encoding the selected design. The details of such a filter routine do not form part of this invention and will not be discussed further, to avoid obscuring the description of the invention. It will be appreciated that software developers, knowledgeable about font software, will readily be able to devise suitable filter implementations.

The position of each of the thus-generated characters in the output font may then be adjusted horizontally and vertically, and assigned an advance width (i.e., distance to the origin of the next character), using the font-wide values specified in the font descriptor file. Horizontal and vertical adjustment is accomplished by simple coordinate translation. Width adjustment may require scaling.

Figure 15:
FIG. 15 is a pictorial illustration of two weights of a given typeface used to generate a third, intermediate weight of the typeface, in accordance with this invention.
Figure 16:
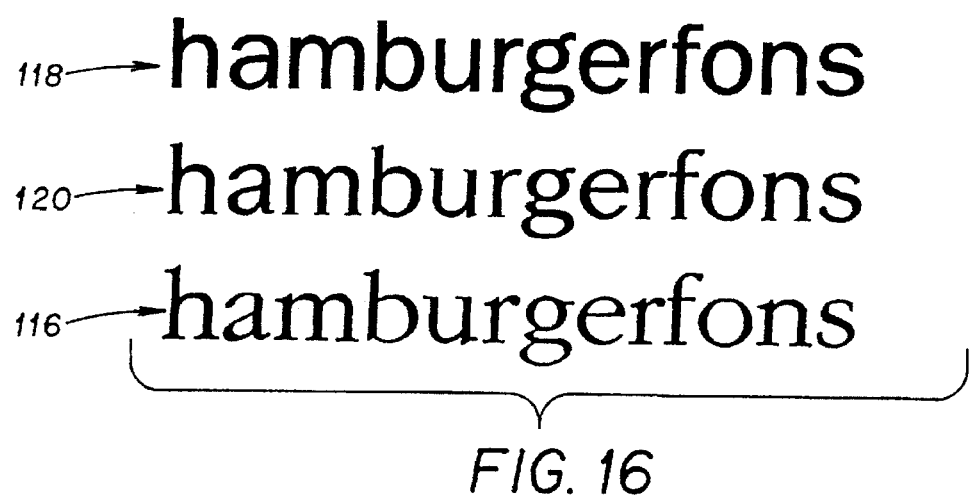
FIG. 16 is a pictorial illustration of two typeface designs, one serifed and one san-serifed, but otherwise similar, used to generate a third, typeface which is partially serifed, in accordance with this invention.
Figure 17:
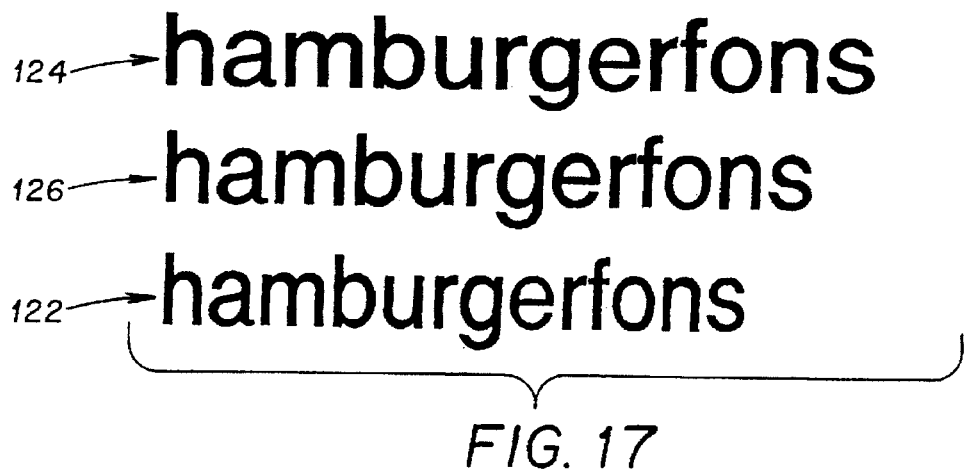
FIG. 17 is a pictorial illustration of two widths of a given typeface used to generate a third, intermediate width of the typeface, in accordance with this invention.

As stated above, the invention further provides the capability of blending two (or more) font descriptor files to create useful intermediate typeface designs. Any two font descriptor files can be combined in a variety of ways to create a third descriptor file. The resulting descriptor file can be further combined to yield yet additional descriptor files. Many combinations of the design features and spacing values of two descriptor files result in intermediate font designs that share features of each of the two base typefaces. For instance, with reference to FIG. 15 a blend between a light weight 110 and a heavy weight 112 of a typeface will yield a weight 114 somewhere between the heavy and the light. A blend (See FIG. 16) between a serif design 116 and a san serif design 118 may result in a semi-serif design 120, depending on the weightings assigned the original designs or their features. A blend (See FIG. 17) between a narrow width 122 and a wide width 124 may result in an intermediate width typeface design 126, depending on the width weightings assigned the descriptor files corresponding to typefaces 122 and 124.

Consider the example which will now be explained with reference to FIGS. 9–14. FIG. 6 is again the base character design program. However, instead of using the descriptor file 50 of FIG. 7, the generator now used the descriptor file 70 of FIG. 9, to produce in this case the output contour 72 of FIG. 10, represented as well in the table 80 of FIG. 11. The generator functions specified by descriptor file 70, for producing the contour data of table 80, is $x$ coordinate=$a$+0$c$+0.5$e$, $y$ coordinate=$b$+0$d$+0.5$f$.

This provides a stem 72 of a second design. The goal, however, is to produce a character design (and program) which is a blend half-way between the character generated from descriptor 50 and the character generated from descriptor 70. To achieve this result, the generator executes the function blend descriptor=descriptor 50+0.5(descriptor 70 −descriptor 50)

This may be decomposed in the relevant x and y coordinate transformations as follows:

$x$ coordinate=$a$+0.5$c$+0.5$e$ $y$ coordinate=$b$+0.5$d$+0.5$f$.

The resulting descriptor 90 is shown in FIG. 12. From descriptor 90, generator 16 produces the character program fragment 100 (FIG. 13), the corresponding character design 114 being shown in FIG. 14.

This technique is quite flexible. Clearly, fewer than all of the variables in a pair of descriptor files can be blended, for example. Thus combinations of subsets of the design features can be blended to vary specific characteristics, such as stroke weight or serif widths. The blending function can be the same for all of the variables (e.g., a fifty-fifty mix or sixty-five-thirty-five, or some other mix) or different operations can be performed on different variables (e.g., a descriptor file can be created which represents 100% the serif from a first descriptor file and a character weight which is a sixty-forty blend of the weights from two descriptor files).

There are many possible representations for the contour data in the generic, base font program. The contour data must contain a sufficient number of control points to represent the most complex possible rendering of the character design. Those skilled in digital typography employ a variety of computer-aided design tools (i.e., computers and computer programs) to assure they have selected sufficient contour data to represent a character shape to the desired fidelity).

When an optional feature of a character may be omitted entirely for some final character programs and underlying designs, the set of control points for that feature preferably are distributed initially, in the base font, at a single Cartesian coordinate. For instance, serifs disappear in san serif designs. The san serif design is preferably used for a base font. In the base font, therefore, all the control points associated with the serif for a given stem preferably are clustered at the corner of the stem. (Multiple control points will, thus, have the same coordinates in the base font, but each point has its own unique identity and can be mapped independently to the output font.) The design feature vectors for the serif points are specified such that the points separately are moved, by the generator, from the corner of the stem to their desired resting positions in the serif.

Figure 18:
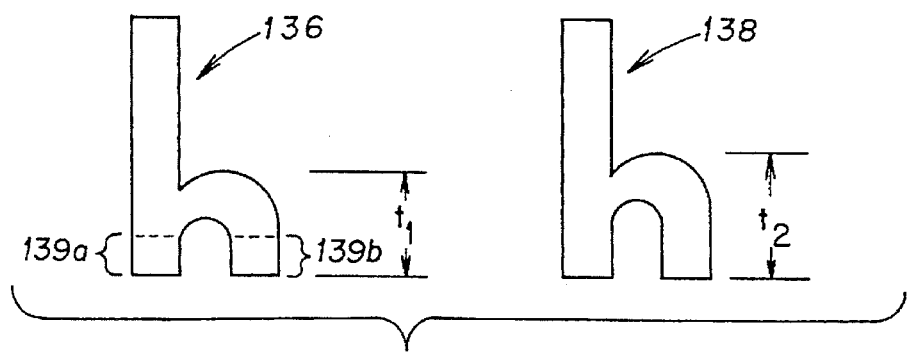
FIG. 18 is a pictorial illustration of one kind of feature stretching according to the invention.

Some character designs are created by stretching a base character design. The stretching process can be achieved by elongating the curves and lines of the base design. See, for example, FIG. 18, wherein the lower case letter "h", 136, is to be modified by stretching the arch from a height $t_1$ to a height $t_2$ as shown at 138. Thus, the increase in height $t_1$ can be achieved by changing the length of segments 139a, 139b in the left and right stems. In other designs, stretching is achieved by introducing additional curve and line segments to the original design. To represent these additional segments that appear in a stretch design and disappear in the compact design, it is recommended that the points for the additional segments be placed at a single point between the segments of the base design. See, for example, FIG. 19, wherein a round letter "o", 140, in a base font is to be transformed to a stretched form 150 for an output font. The outer contour 140 may be formed, for example, of four segments 141–144. The elongation of the letter is obtained by inserting segments 151 and 152 at points 145 (between segments 143, 144) and 146 (between segments 141, 142). Original points 145 and 146 are expanded into new point pairs 145a, 145b and 146a, 146b, respectively. The inner contour is treated similarly.

Figure 20:
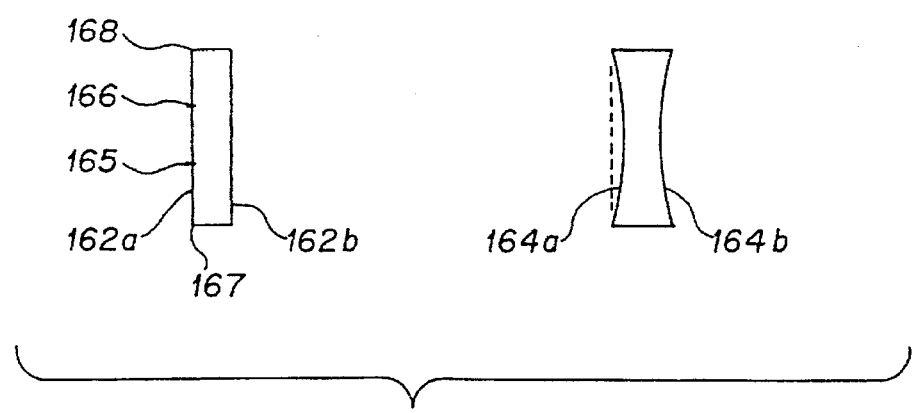
FIG. 20 is a pictorial illustration of the distribution of curve control points according to the invention, for features that are represented as a curve in one typeface design and a straight line in another.

Many character designs contain features that are represented as a curve in one design and a straight line in another. The generic representation for these features, assuming use of a Bezier representation, is a curve segment in which the curve control points are distributed evenly between and co-linear with the ends of the curve. For example, in FIG. 20, the letter "I" may be represented with straight line vertical sides 162a, 162b or with curved sides 164a, 164b. Points 165 and 166 are exemplary control points, as they are evenly distributed between, and co-linear with, curve end points 167 and 168.

Many character designs contain features that are represented as a curve in one design and a straight line in another. The generic representation for these features, assuming use of a Bezier representation, is a curve segment in which the curve control points are distributed evenly between and co-linear with the ends of the curve. For example, in FIG. 20, the letter "I" may be represented with straight line vertical sides 162a, 162b or with curved sides 164a, 164b. Points 165 and 166 are exemplary control points, as they are evenly distributed between, and co-linear with, curve end points 167 and 168.

Figure 19:
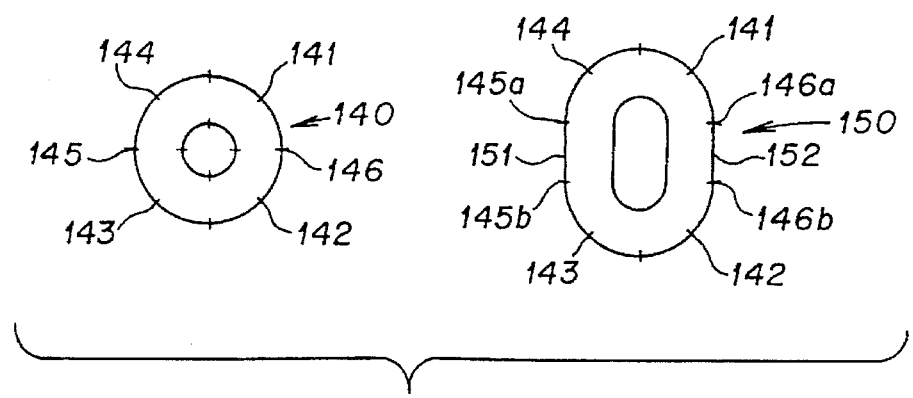
FIG. 19 is a pictorial illustration of another kind of feature stretching according to the invention.

The generator 16 may be implemented as a digital computer executing an appropriate program to carry out the functions specified herein. The necessary data structures which would reside in the memory of the computer (main memory or mass storage), and the operations for one exemplary embodiment of this type, are shown in FIGS. 19.

A base font may be implemented as a set of tables, each containing data representing pieces of the font. That is, characters may be assembled from pieces which see repeated use among various characters in the font, such as stems, arches, serifs, and so forth. These pieces are referred to as "glyphs." (Of course, as stated above, a character may be a single glyph.) The base font contains both the data for the individual glyphs and for the output font descriptions. A typical set of tables might be the following:

Directory of Tables
Font Info
Glyph Name Directory
Glyph Names
Glyph Directory
Glyph Data
Font Names Directory
Font Names
Font Directory
Font Descriptors The table named Directory of Tables contains a directory which specifies the address offset to each of the tables in the font, from an initial address. The Directory of Tables table may have the structure shown in FIG. 21, for example. As indicated there, a first table entry, 180, contains the value of the variable "numTables", which represents the number of tables in the font. A second entry 182 is itself one or more tables, each composed of numTables pairs of four-character table names 182a and the offset 182b from the beginning of the font to that particular table.

The table Font Info, depicted in FIG. 22, for example, contains information specific to this base font. This information may include, but need not be limited to, the following, for example: the value of a variable fontID, 190, which is a unique identification number for the font; the value of a variable "version", 192, which is the version number for the font; a string 194 containing the name of the font; and a string 196 containing a copyright notice for the font.

Each glyph in the base font has a name. The table Glyph Name Directory, illustrated in FIG. 23 is a cross index specifying the offset to each glyph name in the Glyph Names table. The Glyph Name Directory begins with a datum giving the value of the variable "numGlyphs", 202, the number of glyphs in the Glyph Names table. Next, there follows an array offset [1 . .numGlyphs], 204, containing the offsets, in glyph order, for the start of each glyph name string.

In turn, the Glyph Names table contains, in sequence, a string for the name of each glyph in the font.

The table Glyph Directory of FIG. 24 contains a listing of the offset to the data for each glyph in the base font. The first entry, 212, contains the value of the variable "numGlyphs," which represents the number of glyphs named in the Glyph Data table. Next there appears an array offset[1 . .numGlyphs], 214, containing the offsets, in glyph order, for the start of each glyph's data.

The table Glyph Data contains the contour data for all the glyphs in the base font. The data for an individual glyph is stored as shown in FIG. 25. An initial table entry 222 preferably is a character code for the glyph. This code may, for example, be in the so-called Unicode standard or in some other representational code. Next there follows an array 224, called designMap, which contains a mapping of design features for this glyph to font-wide design features. This is followed by a datum 226, originPoint, which specifies the character origin offset, and a datum 228, widthPoint, which specifies the character width. Note that since character width is variable by setting a parameter on a fontwide basis, as well as on a character basis, merely by specifying desired character width one can substitute for a font a character of a first known width another font or character of the same width. Next is an entry 232 which gives the value of the variable numContours, the number of contours in this glyph. This is followed by those contours, 234, with each contour represented as indicated at 236 in FIG. 25. The originPoint, widthPoint and points in segments each are represented by a horizontal coordinate, x, and a vertical coordinate, y; further, if the point has a set of design offsets, they are included in the specification as an array horizontalOffsets and an array verticalOffsets. These arrays specify, respectively, the horizontal and vertical displacements associated with each design feature present in the glyph. To conserve memory and streamline processing, design offsets may be stored only for the design parameters associated with the glyph. The designMap contents specify how the glyph's design offsets map onto the font-wide design parameters. For example, if the glyph uses only design parameters 1, 3 and 5 from a list of 100 possible design parameters in the base font, the designMap would contain an array such as 1,3,5,0 (the final 0 signalling the end of the array). The horizontalOffsets array and the verticalOffsets array for points with design offsets would thus contain only three entries each in this example.

The Font Names Directory table is one containing a list of offsets to each of the output font names in the Font Names table. It has the structure shown in FIG. 26. That is, the first entry, 242, numFontNames, is a variable denoting the number of font names in the FontNames table. Next, there follows an array 246 of offsets to those names.

The table Font Names is a table of strings for all the font names defined in the Font Directory.

The Font Directory table is a list of offsets to the output font descriptors in the Font Discription Table. The Font Directory table has the structure show in FIG. 27. It first contains the value of the variable numFonts, which is the number of font descriptors in the Font Descriptors table, followed by an array, 252, of all sets to the start of each descriptor.

Finally, Font Descriptors is the table containing the data for all the output fonts. Each font descriptor is stored using the structure shown in FIG. 28, which will be self-explanatory. The vector shown in FIG. 28, contains settings for each design parameter encoded in the base font. The first design parameter 262, width class, controls condensing and extending the font. Other design parameters are freely assigned.

Given the font descriptor, an output font is generated, using the algorithm shown in FIG. 29 As this algorithm is illustrated in a pseudo-code form, it is fully the equivalent the equivalent of a flow chart and is self-explanatory.

As mentioned above, fonts can be described as being combinations of design fonts descriptors from the base font. Blends of fonts may be compactly described, using the data structure shown in FIG. 30. The first entry, 302, contains a identification for the base font with which this descriptor works. Next, there follows a string, 304, naming the font family; and a string 306, describing the weight of the font. Finally, there is a binary tree, 308, describing the blend. In turn, each node of the blend tree may be encoded as shown in FIG. 31. There, the variable "amount", 310, specifies the numeric amount (i.e., percentage) the related font provides to the blend. Then there is specified the identification of the base font. Next is a flag which specifies that the base font is nested (i.e, derived from still another font descriptor). Also included is the identification of the blend font or a flag specifying that the blend font itself is nested, 312. A blend font that was derived by combining a base font 300 with 30% of a blend font composed of a base font, which is made up of font 200 blended 75% with blend font 400, which, in turn, is blended 50% with blend font 500, would yield a tree structure such as shown in FIG. 32, and represented, more particularly, in FIG. 33.

The blend font descriptor illustrated in FIGS. 30–33 is turned into an output font by first converting the blend font descriptor into a font descriptor. The resulting font descriptor can then serve as input to the generator algorithm of FIG. 29 to produce an output font. An exemplary algorithm for converting a blend font descriptor into a font descriptor is provided in pseudo-code form in FIG. 34, which is self-explanatory.

It will be observed that blend font descriptors, in general, are much smaller than basic font descriptors.

While in the examples set forth herein, the glyphs and characters shown are some of those involved for Roman fonts, with other glyphs the invention can be used to generate Kanji or other font categories, as well. Other readily conceivable variations on the disclosed embodiment include parametric naming of fonts. This is, a descriptor file can be built from a vector (i.e., string of data values) which specifies a typeface or font by name or number, using a table look-up approach. This may be combined with a taxonomic approach to font naming, so that a font name is formed by concentrating a number of data fileds, each of which contains a specific parameter value. Typical parameters might include font width, height, alternative character topology choices, seris/san serif, italic slant, and so forth. The string of numerical values for the parameters constitutes the typeface name. From this name, a table provides a pointer to a corresponding descriptor file.

Having thus described the basic concept of the invention, it will be readily apparent to those skilled in the art that the foregoing detailed disclosure is intended to be presented by way of example only, and is not limiting. Various alterations, improvements, and modifications will occur and are intended to those skilled in the art, though not expressly stated herein. These modifications, alterations, and improvements are intended to be suggested hereby, and are within the spirit and scope of the invention. Accordingly, the invention is limited only by the following claims and equivalents thereto:

What is claimed is:

1. A computer-implemented method for generating computer programs for producing character-like images in a selected digital type font, comprising the steps of:

operating a computer to retrieve from a computer-readable memory a generic base font file containing instructions and data for a program for reproducing textual character images according to a generic base font;

operating said computer to retrieve from a computer-readable memory a font descriptor file for the selected font, said file containing specifications for operating upon the generic base font to produce said output font; and for each character in the generic base font, generating a character program for a corresponding character in the selected font by performing operations upon the instructions and data of the generic base font file in accordance with the specifications contained in the font descriptor file, wherein at least one of said specifications may specify a transformation operation to be performed upon a portion of a character in the generic base font and which is not to be performed on another portion of said character, and wherein each said character program contains instructions and data for producing characters of the selected font and at least a portion of the instructions and data for the selected font character programs correspond to instructions and data from the corresponding, generic base font character programs transformed in accordance with said specifications, such that at least a portion of a character in the selected font has a different shape than the shape of a corresponding portion of the corresponding character in the generic base font and the character in the selected font is therefore recognizable as being a character in a typeface different from a typeface of the generic base font.

2. A method according to claim 1 wherein the instructions and data in the file for the generic base font include a set of base character programs executable by the computer and comprising for each character in a character set included in said font at least one program for use by a computer to produce an image of said character, each said program including data and instructions representing the contours of a character, a plurality of control points, and for each control point a set of trajectories associated therewith, and wherein the specifications in the font descriptor file include a data structure including in determinable locations values for a set of design variables, each specifying a value for a design feature of the typeface which may be generated using the font, and said method further comprises the steps of:

operating the computer to retrieve from said base font file the data and instructions representing the contours of a selected character, including the control points therein and the set of trajectories associated with each of said control points;

operating the computer to retrieve from said font descriptor file the values for a set of design variables associated therewith, and wherein the step of generating said output font includes the step of forming contour points for inclusion in the output font by transforming coordinates of each control point in the base font file in accordance with a trajectory therefor responsive to a design variable value selected from the font descriptor file.

3. The method of claim 2 wherein the step of generating said output font further includes a step of removing redundant formed contour points so as to avoid inclusion of redundant formed contour points in a generated character program.

4. A computer-implemented method for generating an output digital font usable to generate text in a typeface whose design is a blend of design features of first and second typefaces, each of said typeface design features being represented in a corresponding descriptor file, comprising the steps of:

operating a computer to retrieve from memory a file containing instructions and data for generating text in a generic base font;

operating the computer to retrieve from memory first and second font descriptor files, each containing specifications for operating upon the generic base font to produce an output font for, respectively, a first typeface and a second typeface;

combining a specification contained in the first font descriptor with a specification contained in the second font descriptor file to create a third font descriptor file containing specifications for a typeface produced by said combination; and operating the digital computer to generate said output font by performing operations upon the generic base font in accordance with the specifications contained in the third font descriptor file, to produce a character program for each character in the base font wherein the data representing the output font is the generic font data as transformed in accordance with said specifications, such that for at least one character a portion of the shape of said character differs from the shape of a corresponding portion of the corresponding character in the generic base font because of said transformation.

5. The method of claim 4 wherein each font descriptor file contains specifications for a plurality of parameters for operating upon the generic base font and the step of combining further comprises, for at least one corresponding parameter specification in each of the first and second font descriptor files, the steps of:

for at least one character of the generic base font, generating as a parameter specification therefor a value which is a function of the values for said parameter specification in said first and second font descriptor files; and placing in the third font descriptor file the value of the algebraic combination, as a value for said parameter specification for said character therein, whereby said character in the typeface design generated by the third font descriptor file contains at least one feature corresponding to said combination of the values of said feature in the typefaces generated by the first and second font descriptor files.

6. The method of claim 4 wherein each font descriptor file contains specifications for a plurality of parameters for operating upon the generic base font and the step of combining further comprises the steps of:

for at least one corresponding parameter specification in each of the first and second font descriptor files, forming an algebraic combination of the values for said specification in said first and second font descriptor files; and placing in the third font descriptor file the value of the algebraic combination, as a values for said parameter specification therein, whereby the typeface design generated by the third font descriptor file contains at least one feature corresponding to a combination of the values of said feature in the typefaces generated by the first and second font descriptor files.

7. The method of claim 6 wherein the algebraic combination is a weighted average of the specification values in the first and second descriptor files.

8. The method of claim 7 further including the step of accepting as input from the font descriptor files values for weights to be used in forming said weighted average.

9. The method of any of claims 6–8 wherein the typeface design generated by the third font descriptor file contains a plurality of features corresponding to a consistent combination of the values of said feature in the typefaces generated by the first and second font descriptor files.

* * * * *